Aug. 14, 1956
C. J. WESTLING
2,758,734
STRADDLE TRUCK-MOUNTED MATERIAL
GRIPPING AND HANDLING DEVICE
Filed May 15, 1953
3 Sheets-Sheet 3
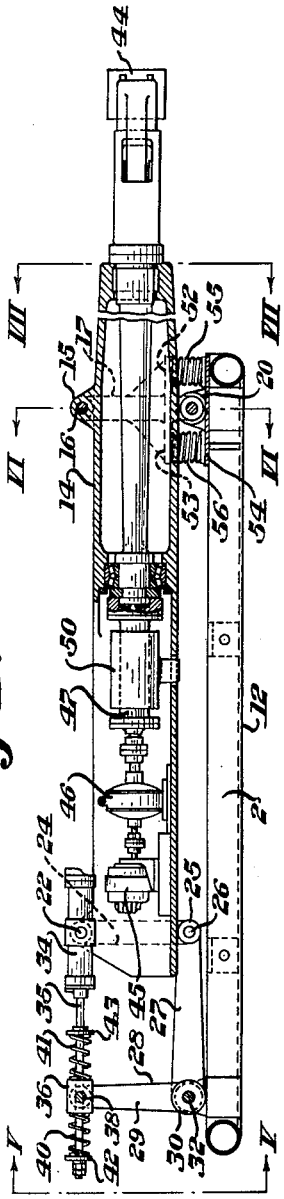
INVENTOR
CARL J. WESTLING
By Hoges, Leonard & Buell
his attorneys United States Patent Office 2,758,734
Patented Aug. 14, 1956

2,758,734

STRADDLE TRUCK-MOUNTED MATERIAL GRIPPING AND HANDLING DEVICE

Carl J. Westling, Pittsburgh, Pa., assignor to Vulcan Research Corporation, Pittsburgh, Pa., a corporation of Pennsylvania Application May 15, 1953, Serial No. 355,211

15 Claims. (Cl. 214—653)

This invention relates to a straddle truck-mounted material handling device, i. e., to a material handling device mounted upon and carried by a straddle truck which constitutes a mobile support for the material handling device.

My straddle truck-mounted material handling device may be a permanent assembly in which the supporting structure for the material handling device is an integral part of the straddle truck but it is advantageous to make the material handling device per se separate and readily disconnectable from the straddle truck. In either case the straddle truck-mounted material handling device has advantages in compactness and economy and has great utility when limitation of the vertical field of the material handling device is permissible. The material handling device per se which is hereinafter described is claimed in my copending application Serial No. 355,212, filed of even date herewith.

I provide a straddle truck-mounted material handling device, hereinafter sometimes called a "manipulator," which term is used as a term of broad definition and not as a term of limitation, comprising opposed side portions including means on which the manipulator may be moved about, a top portion joining the upper parts of the side portions providing a space inside the side portions and beneath the top portion, a supporting structure disposed in said space and supported by the side portions, a load-carrying arm, hereinafter sometimes called a "peel," which term is used as a term of broad definition and not as a term of limitation, carried by the supporting structure and means for operating the peel. The means on which the manipulator may be moved about may be any suitable means such as wheels or tractor treads. Normally I prefer to employ four wheels, two carried by each side portion.

I preferably dispose a manipulator unit in the space inside the side portions and beneath the top portion and provide for carrying of the manipulator unit by the side portions, the manipulator unit being separate from the side portions and readily disconnectable therefrom. The means for operating the peel which forms a part of the manipulator unit may be carried by the manipulator unit or partly by the manipulator unit and partly by the top and/or side portions of the structure. I preferably provide means adapted to be rendered operative and inoperative at will connecting the manipulator supporting structure with the side portions of the straddle truck.

The side portions of the straddle truck manipulator preferably include, in addition to means on which the manipulator may be moved about, generally vertically movable load supporting means. Desirably the manipulator unit is carried by the load supporting means so that generally vertical movement of the peel is accomplished by generally vertical movement of the load supporting means. The load supporting means in addition to being generally vertically movable may also be mounted for in and out movement between operative load supporting position and inoperative position remote from the load to be supported. Such construction of the load supporting means is conventional in straddle trucks.

My manipulator is preferably provided with means for turning the peel about its own axis. The peel preferably has tongs in which case means are also provided for operating the tongs.

I preferably provide a motive unit for operating the means on which the manipulator may be moved about, whereby the manipulator is rendered mobile, with connections from the motive unit for operating the peel. I desirably employ a fluid pressure system for operating the peel and fluid compressing means operated by the motive unit for supplying fluid under pressure to the fluid pressure system.

The motive unit for operating the means on which the manipulator is moved about also preferably vertically moves the load supporting means. I preferably provide connections which may be rendered operative and inoperative at will between the fluid compressing means and the fluid pressure system. Desirably means for supplying fluid under pressure are carried by the supporting structure of the manipulator which comprises the side portions and the top portion and readily attachable and detachable flexible connections are provided between the means for supplying fluid under pressure and the peel for conducting fluid under pressure to the peel for operating the same.

The manipulator unit preferably comprises in addition to the peel a cylinder arranged with its axis generally horizontal, a piston operable in the cylinder and means connected with and operable by the piston upon movement thereof in the cylinder for tilting the peel. Such structure is of especial utility in a straddle truck manipulator since by its employment the vertical height of the manipulator unit is maintained at a minimum. This is important since the elevation to which the manipulator unit may be raised is limited by the top portion of the straddle truck.

I preferably interpose resilient means between a portion of the peel and a portion of the mounting means for cushioning vertical shocks imparted to the projecting end of the peel, the resilient means desirably being arranged so as to take up little vertical space. Such structure is likewise important in maintaining the vertical height of the manipulator unit at a minimum to render it especially adaptable to a straddle truck manipulator.

In a preferred form my straddle truck manipulator comprises opposed side portions including means on which the manipulator may be moved about and generally vertically movable load supporting means, a top portion joining the upper parts of the side portions providing a space inside the side portions and beneath the top portion, a manipulator unit disposed in said space and carried by the load supporting means so that generally vertical movement of the manipulator unit is accomplished by generally vertical movement of the load supporting means, the manipulator unit comprising a peel having a projecting end, mounting means for the peel, a cylinder arranged with its axis generally horizontal, a piston operable in the cylinder, means connected with and operable by the piston upon movement thereof in the cylinder for tilting the peel and resilient means interposed between the piston and a portion of the mounting means and arranged generally horizontally cushioning vertical shocks imparted to the projecting end of the peel, a motive unit for operating the first mentioned means to move the manipulator about and for generally vertically moving the load supporting means and thereby generally vertically moving the peel, fluid compressing means operated by the motive unit for supplying fluid under pressure and connections between the fluid compressing means and the cylinder for operating the piston therein.

I also provide yieldable stabilizing means acting on the peel maintaining the peel normally substantially horizontal but yieldable during operation of the peel to permit operative movements thereof.

Other details, objects and advantages of the invention will become apparent as the following description of a present preferred embodiment thereof proceeds.

In the accompanying drawings I have shown a present preferred embodiment of the invention in which Figure 1 is a side elevational view of a straddle truck manipulator with a portion of the peel broken away;

Figure 3 is a fragmentary view partly in elevation and partly in vertical cross section of a portion of the straddle truck manipulator shown in Figure 1;

Figure 4 is a plan view of the structure shown in Figure 3;

Figure 5 is an end elevational view of the structure shown in Figure 3 taken at the line V—V of that figure;

Figure 6 is a vertical transverse cross-sectional view taken on the line VI—VI of Figure 3; and Figure 7 is a vertical transverse cross-sectional view taken on the line VII—VII of Figure 3.

Figure 1:
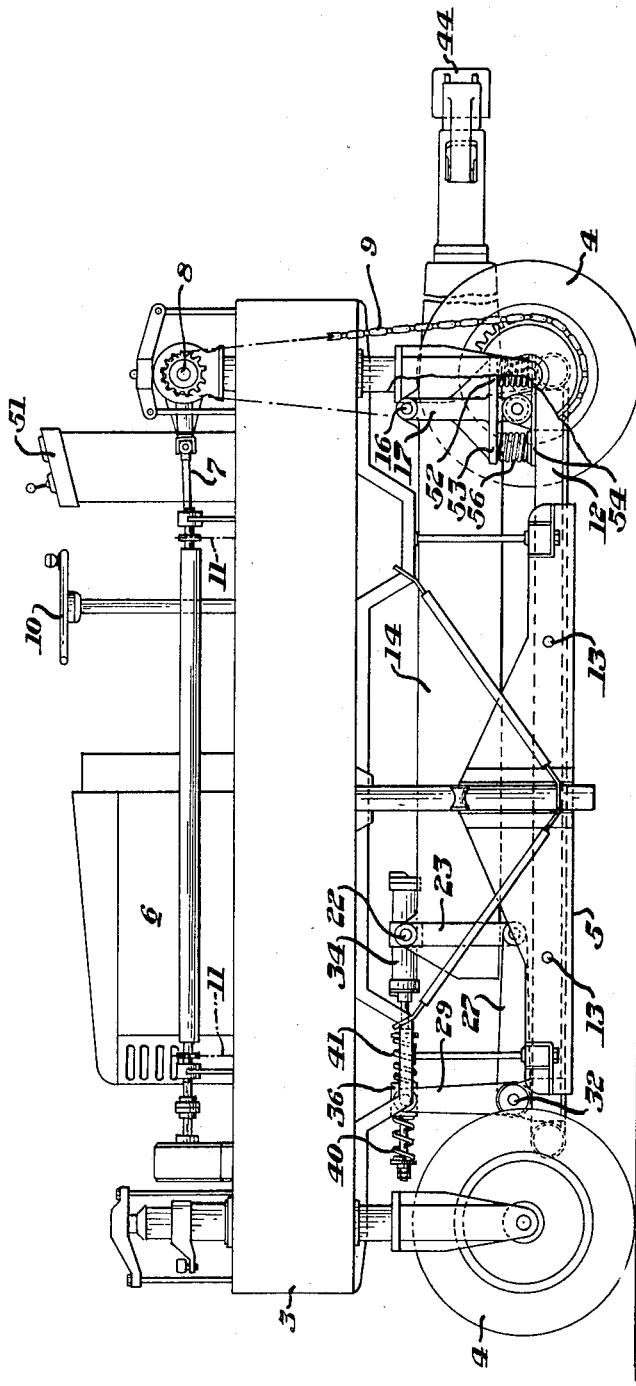

Referring now more particularly to the drawings, there is shown a straddle truck manipulator comprising side portions 2 and a top portion 3 joining the upper parts of the side portions and providing a space inside the side portions and beneath the top portion. Each of the side portions 2 is provided with longitudinally aligned rubber tired wheels 4 on which the manipulator may be moved about. Each of the side portions 2 has generally vertically movable load supporting means 5. The manipulator is provided with a motive unit such as an engine 6 which drives a hydraulic pump whose function will presently be described. The hydraulic pump may be closely coupled to the engine 6 and is not separately shown in the drawings. The engine 6 is connected through a drive shaft 7 with a transverse driven shaft 8 which through sprocket chains 9 drives the wheels 4 at one end of the manipulator. A steering gear controlled by a steering wheel 10 is provided for steering the manipulator in its movements from place to place. Desirably a conventional four-wheel steering gear is utilized. The engine 6 also has connections with chains 11 at the respective sides of the manipulator respectively connected with the load supporting means 5 for raising and lowering the load supporting means.

Everything above described is conventional in a straddle truck except the hydraulic pump. The other elements described are well understood by those skilled in the art and hence are not shown or their operation recited in detail. The load supporting means 5 may move only vertically or such means may be mounted for in and out or transverse movement if desired to aid in picking up and releasing the load. Such provision is conventional in straddle trucks and hence is not shown or described in detail.

I provide a manipulator unit comprising a supporting structure 12 which may be generally in the form of a horizontally oriented frame having longitudinally extending members at its respective sides which are adapted to be disposed upon the respective load supporting means 5. Each of the load supporting means 5 may be of angle form having a generally horizontal leg underlying the supporting structure and a generally vertical leg lying outside and adjacent the supporting structure. I preferably provide means adapted to be rendered operative and inoperative at will connecting the supporting structure with the load supporting means, such connecting means in the structure shown in the drawings constituting bolts 13. Thus the vertical movement of the manipulator unit is accomplished by generally vertical movement of the load supporting means 5 which in turn is accomplished by the engine 6 through the chains 11 as above explained.

The manipulator unit comprises a peel designated generally by reference numeral 14 which is mounted centrally of the supporting structure 12 and extends longitudinally of the manipulator. The peel is provided at its top with a bearing portion 15 to which are pivoted by a horizontal transverse pivot pin 16 generally downwardly vertically extending opposed links 17 each having at its lower end a sleeve 18. A pivot pin 19 passes through the sleeves 18 and also passes through bearing portions 20 of the supporting structure 12.

The peel 14 is also provided with bearing portions 21 through which respectively pass transversely aligned pivot pins 22. Each of the pins 22 also passes through a bearing portion 23 of one of a pair of opposed substantially vertical links 24 each having at its lower end a sleeve 25. A pivot pin 26 passes through the sleeves 25 and also passes through opposed horizontally extending arms 27 of a bell crank lever designated generally by reference numeral 28. The bell crank lever 28 has a pair of opposed generally vertically extending arms 29 which are connected with the arms 27 by a sleeve 30. The vertical arms 29 are welded to the sleeve 30 at 31. The arms 27 are also welded to the sleeve 30. Thus the bell crank lever 28 is constituted by the structure 27—29—30. A pin 32 passes through the sleeve 30 and also through bearing portions 33 of the supporting structure 12. Thus the bell crank lever 28 is pivoted to the supporting structure 12 and the links 24 are pivoted to the bell crank lever at the extremities of the horizontal arms 27 thereof, the links 24 in turn being pivoted to the peel. The links 24 are substantially or approximately parallel to the links 17 so that the links 17 and 24 form what may be termed a parallel motion linkage through which the peel is carried by the supporting structure. However, the parallel motion linkage is not a true parallelogram linkage since the links 24 may partake of slight angular movement relatively to the links 17 as will presently be described.

The inner ends of the pins 22 constitute trunnions for mounting a cylinder 34 in which operates a piston having a piston rod 35 connected therewith. I provide a block 36 having a bore 37 therethrough and trunnion pins 38 projecting therefrom at opposite sides. The trunnion pins 38 are disposed within bearing portions 39 at the upper ends of the vertically oriented links 29 of the bell crank lever 28. The piston rod 35 passes through the bore 37 and compression coil springs 40 and 41 are biased between the piston rod and the block 36 at opposite sides of the block. The spring 40 bears between the block 36 and a collar 42 on the piston rod while the spring 41 bears between the block 36 and a collar 43 on the piston rod.

The peel 14 carries tongs 44 which project from the manipulator for the handling of work as shown. The tongs are mounted for turning movement about the axis of the peel as is conventional, turning of the tongs being effected by a hydraulic motor 45 connected through a gear reducer 46 with a cylinder 47 containing a piston with which is connected a tongs operating rod 49. A sleeve manifold 50 is provided about the cylinder 47 for admitting and exhausting fluid at opposite sides of the piston in the cylinder regardless of the rotational position of the cylinder. Thus the tongs can be opened and closed and turned in conventional manner in any position of the peel with respect to elevation or tilt.

I provide stabilizing means for normally maintaining the peel 14 substantially horizontal. Each of the opposed links 17 has integral therewith generally horizontally and longitudinally extending projections 52 and 53, the projections 52 extending forwardly and the projections 53 extending rearwardly. The downward faces of the projections 52 and 53 are disposed directly above and spaced a short distance from a pad portion 54 of the supporting structure 12. Compressed between the downward faces of the respective projections 52 and 53 and the pad portion 54 are compression coil springs 55 and 56, respectively. The springs 55 and 56 are continuously under compression and maintain the peel normally in the position shown in the drawings. The springs are adapted to be compressed to permit movements of the peel presently to be described.

The piston in the cylinder 34 is for the purpose of tilting the peel. When that piston is moved toward the right viewing Figures 1, 3 and 4 the spring 40 is compressed, the bell crank lever 28 is turned in the clockwise direction, the right-hand end of the peel is tilted upwardly and the springs 56 are compressed. When the piston in the cylinder 34 is moved toward the left viewing Figures 1, 3 and 4 the spring 41 is compressed, the bell crank lever 28 is turned in the counterclockwise direction, the right-hand end of the peel is tilted downwardly and the springs 55 are compressed. The springs 40 and 41 act as shock absorbers to relieve the manipulator as a whole of shocks imparted to the peel when the manipulator is in use. When the right-hand end of the peel viewing Figures 1, 3 and 4 is subjected to a downward force the peel tends to tilt about the pin 16 turning the bell crank lever 28 in the counterclockwise direction and compressing the spring 40. When the right-hand end of the peel viewing Figures 1, 3 and 4 is subjected to an upward force the peel tends to tilt about the pin 16 turning the bell crank lever 28 in the clockwise direction and compressing the spring 41. The springs 55 and 56 also have a shock absorbing function.

The cylinder 34 and block 36 may be reversed in position if desired without affecting the operation of the manipulator; that is to say, the cylinder 34 may be mounted on the vertical arms of the bell crank lever 28 and the block 36 may be mounted where the cylinder 34 is shown as being mounted.

As mentioned above a hydraulic pump is mounted in connection with the engine 6 and is driven thereby. The hydraulic pump is connected with the cylinder 34 and with the cylinder 47 through the manifold 50 and also with the motor 45. If the manipulator unit is made separate and removable from the straddle truck the fluid connections between the pump and the cylinders are readily connectable and disconnectable. In any event, they are flexible to allow for the relative movements of the parts as above explained.

The springs 40 and 41 also act to absorb shocks imparted lengthwise of the peel. If, for example, the peel is subjected to a shock at its right-hand end viewing Figures 1, 3 and 4 forcing it toward the left the links 17 and 24 tend to tilt in the counterclockwise direction about the respective pivot pins 19 and 26 and the spring 41 is compressed.

Figure 2:
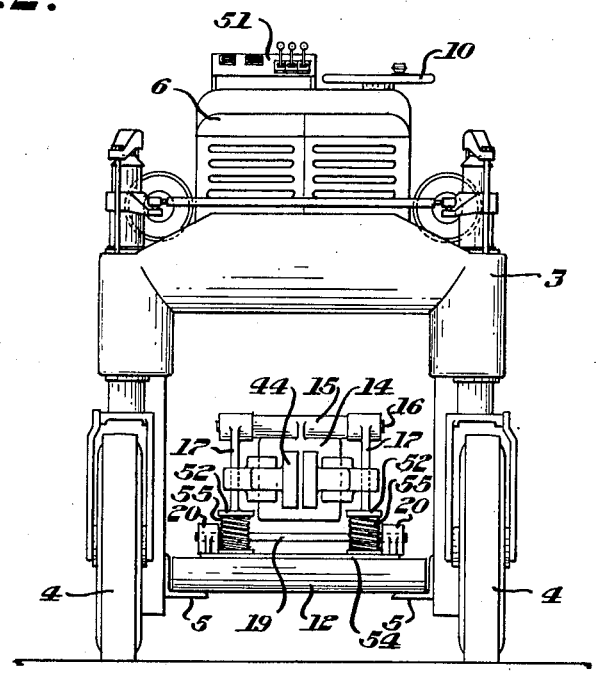
Figure 2 is a front elevational view of the straddle truck manipulator shown in Figure 1.

The manipulator controls may be located in a pulpit 51 mounted atop the manipulator as shown in Figures 1 and 2, giving the operator clear vision of the tongs and the work carried thereby. The straddle truck manipulator is economical of space and the manipulator unit is of low cost and may be made adaptable to any conventional straddle truck. The manipulator structure shown and described is especially well adapted for use in a straddle truck since its vertical height is kept to a minimum so as not to unduly limit the possible vertical movement of the manipulator unit beneath the top portion 3 of the straddle truck.

While I have shown and described a present preferred embodiment of the invention it is to be distinctly understood that the invention is not limited thereto but may be otherwise variously embodied within the scope of the following claims.

I claim:

1. A straddle truck-mounted material handling device comprising opposed side portions including means on which the device may be moved about, a top portion joining the upper parts of the side portions providing a space inside the side portions and beneath the top portion, a supporting structure disposed in said space and supported by the side portions, a load-carrying arm carried by the supporting structure, projecting generally horizontally therefrom and having load handling means adjacent the projecting end thereof and means for operating the load handling means.

2. A straddle truck-mounted material handling device comprising opposed side portions including means on which the device may be moved about, a top portion joining the upper parts of the side portions providing a space inside the side portions and beneath the top portion, a material-handling unit disposed in said space and carried by the side portions, the material-handling unit being separate from the side portions and readily disconnectable therefrom, the material-handling unit comprising a load-carrying arm projecting generally horizontally therefrom, the load-carrying arm having load handling means adjacent the projecting end thereof, and means for operating the load handling means.

3. A straddle truck-mounted material handling device comprising opposed side portions including means on which the device may be moved about, a top portion joining the upper parts of the side portions providing a space inside the side portions and beneath the top portion, a material-handling unit comprising a supporting structure and a load-carrying arm carried thereby disposed in said space, the load-carrying arm projecting generally horizontally and having load handling means adjacent the projecting end thereof, means adapted to be rendered operative and inoperative at will connecting the supporting structure with the side portion and means for operating the load handling means.

4. A straddle truck-mounted material handling device comprising opposed side portions including means on which the device may be moved about and generally vertically movable load supporting means, a top portion joining the upper parts of the side portions providing a space inside the side portions and beneath the top portion, a material-handling unit comprising a load-carrying arm disposed in said space and carried by the load supporting means so that generally vertical movement of the arm is accomplished by generally vertical movement of the load supporting means, the load-carrying arm projecting generally horizontally and having load handling means adjacent the projecting end thereof, and means for operating the load handling means.

5. A straddle truck-mounted material handling device comprising opposed side portions including means on which the device may be moved about and generally vertically movable load supporting means, a top portion joining the upper parts of the side portions providing a space inside the side portions and beneath the top portion, a material-handling unit comprising a supporting structure and a load-carrying arm carried thereby disposed in said space and carried by the load supporting means so that generally vertical movement of the arm is accomplished by generally vertical movement of the load supporting means, means adapted to be rendered operative and inoperative at will connecting the supporting structure with the load supporting means and means for operating the arm to handle work.

6. A straddle truck-mounted material handling device comprising opposed side portions including means on which the device may be moved about, a top portion joining the upper parts of the side portions providing a space inside the side portions and beneath the top portion, a supporting structure disposed in said space and supported by the side portions, a load-carrying arm carried by the supporting structure and projecting generally horizontally therefrom, means for turning the arm about its own axis, the arm having tongs, and means for operating the tongs.

7. A straddle truck-mounted material handling device comprising opposed side portions including means on which the device may be moved about, a top portion joining the upper parts of the side portions providing a space inside the side portions and beneath the top portions, a material-handling unit disposed in said space and supported by the side portions, the material-handling unit including a load-carrying arm projecting generally horizontally and having load handling means adjacent the projecting end thereof, a motive unit for operating the first mentioned means to move the device about and connections from the motive unit to the device for operating the arm.

8. A straddle truck-mounted material handling device comprising opposed side portions including means on which the device may be moved about, a top portion joining the upper parts of the side portions providing a space inside the side portions and beneath the top portion, a material-handling unit disposed in said space and supported by the side portions, the material-handling unit including a load-carrying arm projecting generally horizontally and having load handling means adjacent the projecting end thereof, a motive unit for operating the first mentioned means to move the device about, a fluid pressure system for operating the arm and fluid compressing means operated by the motive unit for supplying fluid under pressure to the fluid pressure system.

9. A straddle truck-mounted material handling device comprising opposed side portions including means on which the device may be moved about and generally vertically movable load supporting means, a top portion joining the upper parts of the side portions providing a space inside the side portions and beneath the top portion, a material-handling unit comprising a supporting structure and a load-carrying arm carried thereby disposed in said space and carried by the load supporting means so that generally vertical movement of the arm is accomplished by generally vertical movement of the load supporting means, means adapted to be rendered operative and inoperative at will connecting the supporting structure with the load supporting means, a motive unit for operating the first mentioned means to move the device about and for generally vertically moving the load supporting means, a fluid pressure system for operating the arm, fluid compressing means operated by the motive unit for supplying fluid under pressure to the fluid pressure system and connections adapted to be rendered operative and inoperative at will between the fluid compressing means and the fluid pressure system.

10. A straddle truck-mounted material handling device comprising a supporting structure comprising opposed side portions including means on which the device may be moved about and a top portion joining the upper parts of the side portions providing a space inside the side portions and beneath the top portion, a material-handling unit disposed in said space and carried by the supporting structure, the material-handling unit being separate from the supporting structure and readily disconnectable therefrom, the material-handling unit comprising a load-carrying arm, means carried by the supporting structure for supplying fluid under pressure and readily attachable and detachable flexible connections between the last mentioned means and the arm for conducting fluid under pressure to the arm for operating the same.

11. A straddle truck-mounted material handling device comprising a supporting structure comprising opposed side portions including means on which the device may be moved about and a top portion joining the upper parts of the side portions providing a space inside the side portions and beneath the top portion and a material-handling unit disposed in said space and carried by the supporting structure, the material-handling unit comprising a load-carrying arm, a cylinder arranged with its axis generally horizontal, a piston operable in the cylinder and means connected with and operable by the piston upon movement thereof in the cylinder for tilting the arm.

12. A straddle truck-mounted material handling device comprising a supporting structure comprising opposed side portions including means on which the device may be moved about and a top portion joining the upper parts of the side portions providing a space inside the side portions and beneath the top portion and a material-handling unit disposed in said space and carried by the supporting structure, the material-handling unit comprising a load-carrying arm having a generally horizontally projecting end, mounting means for the arm and resilient means interposed between a portion of the arm and a portion of the mounting means and arranged generally horizontally cushioning vertical shocks imparted to the projecting end of the arm.

13. A straddle truck-mounted material handling device comprising a supporting structure comprising opposed side portions including means on which the device may be moved about and a top portion joining the upper parts of the side portions providing a space inside the side portions and beneath the top portion and a material-handling unit disposed in said space and carried by the supporting structure, the material-handling unit comprising a load-carrying arm having a projecting end, mounting means for the arm, a cylinder arranged with its axis generally horizontal, a piston operable in the cylinder, means connected with and operable by the piston upon movement thereof in the cylinder for tilting the arm and resilient means interposed between the piston and a portion of the mounting means and arranged generally horizontally cushioning vertical shocks imparted to the projecting end of the arm.

14. A straddle truck-mounted material handling device comprising opposed side portions including means on which the device may be moved about and generally vertically movable load supporting means, a top portion joining the upper parts of the side portions providing a space inside the side portions and beneath the top portion, a material-handling unit disposed in said space and carried by the load supporting means so that generally vertical movement of the material-handling unit is accomplished by generally vertical movement of the load supporting means, the material-handling unit comprising a load-carrying arm having a projecting end, mounting means for the arm, a cylinder arranged with its axis generally horizontal, a piston operable in the cylinder, means connected with and operable by the piston upon movement thereof in the cylinder for tilting the arm and resilient means interposed between the piston and a portion of the mounting means and arranged generally horizontally cushioning vertical shocks imparted to the projecting end of the arm, a motive unit for operating the first mentioned means to move the device about and for generally vertically moving the load supporting means and thereby generally vertically moving the arm, fluid compressing means operated by the motive unit for supplying fluid under pressure and connections between the fluid compressing means and the cylinder for operating the piston therein.

15. A straddle truck-mounted material handling device comprising a supporting structure comprising opposed side portions including means on which the device may be moved about and a top portion joining the upper parts of the side portions providing a space inside the side portions and beneath the top portion and a material-handling unit disposed in said space and carried by the supporting structure, the material-handling unit comprising a load-carrying arm having a generally horizontally projecting end, mounting means for the arm and yieldable stabilizing means acting on the arm maintaining the arm normally substantially horizontal.

(References on following page)

References Cited in the file of this patent

UNITED STATES PATENTS

| | | |
|---|---|---|
| 1,480,257 | Gerlinger | Jan. 8, 1924 |
| 1,676,638 | Eastham | July 10, 1928 |
| 1,881,169 | Brosius | Oct. 4, 1932 |
| 1,930,467 | Brosius | Oct. 17, 1933 |
| 2,410,373 | Westervelt | Oct. 29, 1946 |
| 2,578,070 | Jones | Dec. 11, 1951 |
| 2,629,507 | Olson | Feb. 24, 1953 |
| 2,641,806 | Leckrone | June 16, 1953 |
| 2,675,934 | Kennedy | Apr. 20, 1954 |
| 2,677,475 | Davies et al. | May 4, 1954 |

FOREIGN PATENTS

| | | |
|---|---|---|
| 306,331 | Germany | Jan. 17, 1922 |